United States Patent [19]

Ho et al.

[11] 3,727,201

[45] Apr. 10, 1973

[54] INFORMATION STORAGE SYSTEM

[75] Inventors: Shu-Kuang Ho, Chelmsford; An Wang, Lincoln, both of Mass.

[73] Assignee: Wang Laboratories, Inc., Tewksbury, Mass.

[22] Filed: Sept. 22, 1970

[21] Appl. No.: 74,369

[52] U.S. Cl..340/174 SP, 340/174 AB, 340/174 CC, 340/174 LA, 340/174 NC, 340/174 WA

[51] Int. Cl.............................G11c 5/06, G11c 17/00

[58] Field of Search..................340/174 AB, 174 SP, 340/174 TB

[56] References Cited

UNITED STATES PATENTS

| | | | |
|---|---|---|---|
| 3,488,641 | 1/1970 | Faulkner et al. | 340/174 AB |
| 3,573,763 | 4/1971 | Sramek | 340/174 TB |
| 3,466,612 | 9/1969 | Myers et al. | 340/174 AB |
| 3,319,234 | 5/1969 | Brette | 340/174 AB |
| 3,396,373 | 8/1969 | Didic | 340/174 AB |
| 3,668,696 | 6/1972 | Brawley | 340/174 AB |
| 3,688,307 | 8/1972 | Chao | 340/174 AB |

FOREIGN PATENTS OR APPLICATIONS

| | | | |
|---|---|---|---|
| 461,609 | 1/1971 | Japan | 340/174 AB |

*Primary Examiner*—James W. Moffitt
*Attorney*—Willis M. Ertman

[57] ABSTRACT

A fixed information storage system includes a plurality of magnetic elements, each of which has linear magnetic characteristics and has a readout winding coupled to it. A plurality of data lines are arranged so that each data line links a different group of magnetic elements. A constant current source, in response to input signal, applies a current pulse to a selected data line to produce output signals in the readout windings of those magnetic elements coupled to the selected data line.

4 Claims, 7 Drawing Figures

INFORMATION STORAGE SYSTEM

SUMMARY OF THE INVENTION

Figure 2:
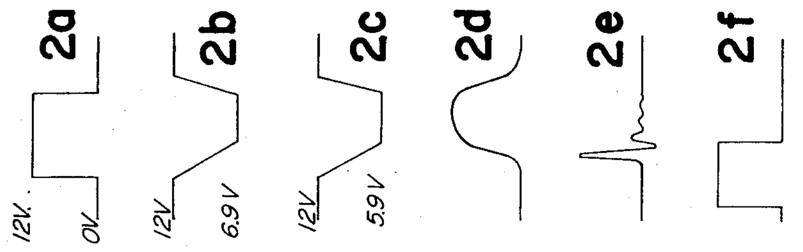

This invention relates to information storage systems suitable for use in computing apparatus and more particularly to such memory system of the fixed or prewired type.

In a prewired memory system of the type in which magnetic elements are employed, information is permanently stored as a function of the physical configuration of windings relative to the magnetic elements, in contrast to other magnetic memory systems in which information is magnetically stored in individual magnetic storage elements. Where it is desired to store information relatively permanently, a fixed prewired fixed information memory is useful.

In accordance with the present invention, a fixed information magnetic memory employs a plurality of magnetic elements. A plurality of data lines are disposed in magnetic linking relation to selected magnetic elements, each data line typically magnetically linking a different group of the magnetic elements from all the other data lines, and a readout winding is coupled to each magnetic element. The circuitry includes means for selecting a particular data line and common means for energizing the selected data line to induce output signals in the readout windings coupled to those magnetic elements magnetically linked to the selected data line.

In a preferred embodiment, the magnetic elements are saturable magnetic cores constructed of linear magnetic material, that is the cores do not exhibit a significant hysteresis characteristic. A plurality of data line selection switches are connected to each data line and the switches in turn are controlled through a decoding matrix. The common means for energizing the selected data line includes a pulsed constant current source. The pulse applied to the current source is of short duration (200 to 400 nanoseconds) and the circuitry includes means for modifying its leading edge to reduce noise coupling between the selected and adjacent non-selected data lines. The response of each coupled magnetic element to the changing edge of the current pulse is sensed by strobing or other techniques. In a particular embodiment, discrimination is provided in the readout circuitry by resetting the storage device coupled to each output winding during the first portion of the current pulse application cycle, thus discriminating between an output signal induced by a signal on the selected data line and other signals induced in the output windings by spurious signals capacitively coupled to other data lines.

The current source in a particular embodiment includes a normally conducting transistor across which a Zener diode that establishes a voltage reference is connected. A capacitor connected across the Zener diode modifies the leading edge of the current pulse and that shaped current pulse is amplified by a second transistor and applied via coupling diodes to a series of drive transistors, each connected in common base configuration.

The base of each drive transistor is connected to a switching or selection network and the collector is connected to a set of data lines. Each data line, after passing selected magnetic elements in magnetic linking relation, is connected via a coupling diode to a separate second switching (selection) network. This circuitry generates a current pulse which is passed by the selected data line as a function of the settings of the two selection networks and that pulse induces an output signal in the output winding of each coupled magnetic element, which output signal is applied via a switching transistor to a bistate storage device. The shaping of the leading edge of the current pulse reduces cross talk and the storage flip flop is rendered more sensitive by overlap of the reset pulse and the current pulse so that flip flop does not respond to spurious noise signals due to capacitive coupling to other data lines.

Figure 1:
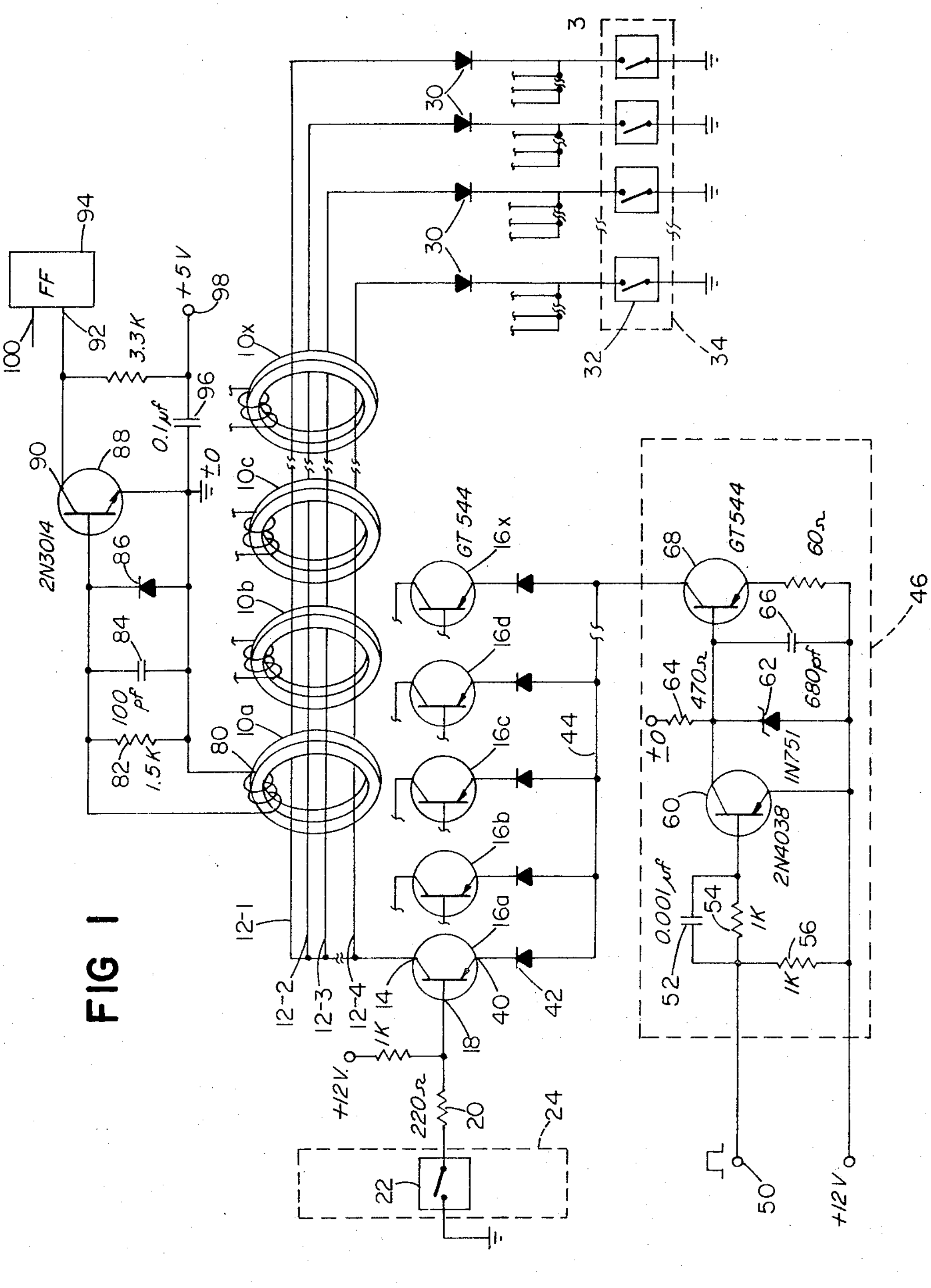

The invention provides in a particular embodiment a fixed (read only) memory having a capacity of 1,643 bit words and an access time in the order of 100–200 nanoseconds. The invention in such embodiment provides an economical, high speed, read only memory system. Other objects, features and advantages of the invention will be seen as the following description of a particular embodiment thereof progresses, in conjunction with the drawings, in which:

FIG. 1 is a schematic diagram of circuitry constructed in accordance with the invention; and FIG. 2A, 2B, 2C, 2D, 2E and 2F are timing diagrams indicating relationship of signals at particular points in the circuitry shown in FIG. 1.

DESCRIPTION OF PARTICULAR EMBODIMENT

With reference to FIG. 1, the memory elements 10 are in the form of magnetic cores that define closed magnetic flux paths and are constructed of linear magnetic material. In a particular embodiment 43 magnetic cores are employed, only being four shown in FIG. 1. The cores 10 may take various forms and in a particular embodiment two U-shaped core elements (Indiana General type F2711–1) of Ferramic 0–5 material are employed to form each core. A multiplicity of data lines 12 are selectively passed through the cores 10; for example, data line 12-1 passes through core 10*a*, data line 12-2 passes through cores 10*c* and 10*x*, data line 12-3 passes through cores 10*b* and 10*x*, and data line 12-4 passes through cores 10*a*, 10*c* and 10*x*. Those data lines are connected to the collector 14 of a drive control transistor 16*a* connected in common base configuration. Other data lines 12 are connected to similar drive control transistors 16*b*–16*x*. The base electrode 18 of each drive control transistor is connected via resistor 20 to a corresponding selection switch diagrammatically indicated at 22 that operates in response to signals applied to a decoding network diagrammatically indicated at 24. Thus in response to signals applied to decoding network 24, one switch 22 is closed to condition one drive control transistor 16. The other ends of the data lines 12 are connected through diodes 30 to similar selection switches diagrammatically indicated at 32 which are operated in response to a second similar decoding network diagrammatically indicated at 34. Thus in response to signals applied to decoder 34, one switch 32 is closed, so that one data line 12 is selected by the conjoint operation of decoders 24 and 34. In a particular embodiment, decoder 24 controls 32 switches and decoder 34 controls 64 switches, the two decoders together having the capacity to select one of 2048 (32 × 64) data lines 12 that pass through cores 10 in a selective manner, the word configuration being determined by the way the data line is wired relative to the cores as indicated above.

Connected to all the emitters 40 of transistors 16 via diodes 42 and bus 44 is a common constant current source 46. That constant current source includes a terminal 50; a switching network that includes capacitor 52 and resistors 54, 56 which decreases the voltage difference between base and emitter of transistor 60, that transistor having a switching time in the order of twenty nanoseconds. Connected across the emitter and collector of transistor 60 is a Zener diode 62 with biasing resistor 64 determining the operating point of the Zener diode. Capacitor 66 modifies the leading edge of the current pulse produced by the switching transistor 60 which is amplified by transistor 68 for application to common bus 44.

The signal from this pulsed current source is applied to the emitters of all the drive control transistors 16 and is passed by the selected transistor 16 for application to the data lines 12 connected to the collector of that transistor. A current pulse of 70 to 90 milliamperes (of excellent stability and reproduceability due to the common base configuration of transistors 16) flows in the data line 12 connected to the closed switch 32.

Each core 10 has a thirty-three turn output winding 80 to which is coupled a circuit that includes damping resistor 82, capacitor 84, clamping diode 86, and transistor 88. The collector 90 of transistor 88 is coupled to the set input 92 of flip flop 94. The emitters of all the transistors 88 are connected to a grounded bus. Decoupling capacitors 96 are employed as necessary, in a 43 core embodiment, 11 capacitors 96 being connected between the ground bus and the +5 volt source at terminal 98. High speed flip flop 94 has a reset input 100.

In operation, decoders 24 and 34 close a switch 22 and a switch 32, respectively, to select a data line 12. The typical delay of the decoders is in the order of 50 nanoseconds. After selection, an input pulse of shape indicated in FIG. 2*a* and of 200 nanoseconds duration is applied to terminal 50 to turn switching transistor 60 off and produce a voltage transition at the base of transistor 68 of shape generally as indicated in FIG. 2*b*. The output signal from transistor 68 (indicated in FIG. 2*c*) is applied via the selected common base transistor 16 for transmission over the selected drive line. The signal induced in the output windings of those cores 10 to which the selected drive line 12 is coupled is indicated in FIG. 2*d*. Due to capacitive coupling, a noise signal may be induced in one or more other drive lines 12, such noise signals being of much shorter duration (due to the transient of leading edge) and of configuration generally as indicated in FIG. 2*e*. To discriminate between the data signals (FIG. 2*d*) and the spurious signals (FIG. 2*e*), a reset pulse (FIG. 2*f*) is applied to the reset terminals 100 of flip flops 94 over lap with the application of the input pulse (FIG. 2*a*) to terminal 50 of the current source, this reset pulse inhibiting flip flop 94 from responding to the spurious noise pulses that may appear on non-selected data lines 12. Alternatively, strobing of the peaking of the data signal outputs of the cores may be used for such discrimination.

Thus the invention provides a high speed,, economical and large capacity read only memory. While a particular embodiment has been shown and described, various modifications will be apparent to those skilled in the art and therefore it is not intended that the invention be limited to the disclosed embodiment or to details thereof and departures may be made therefrom within the spirit and scope of the invention defined in the claims.

What is claimed is:

1. A fixed information storage system comprising a plurality of magnetic cores, each magnetic core having an aperture and having linear magnetic characteristics, a plurality of data lines, each data line passing through the apertures of a different group of data cores, a readout line coupled to each data core, means for selecting a particular data line including a plurality of input selection means, each said selection means including a solid state device having emitter, base and collector terminals, each said solid state device being connected in common base configuration and having its collector terminal connected to one end of a data line and its base terminal connected to a selector switch, a plurality of switch devices arranged in a two-dimensional array, a first group of said switch devices being connected to the base electrodes of corresponding ones of said solid state devices and a second group of said switches being connected to the ends of said data lines remote from said solid state devices, a constant current source connected to the emitter terminals of all of said solid state devices, means responsive to an input signal for applying a current pulse from said constant current source to the selected data line to produce output signals in said readout lines of those data elements coupled to said selected data line, a storage device connected to each said readout line and means for applying a reset signal to said storage devices in overlap with said input signal, said reset signal terminating prior to said input signal.

2. The system as claimed in claim 1 wherein said constant current source includes a normally conducting transistor, voltage regulator means connected across said transistor, and a capacitor connected across said voltage regulator for modifying the leading edge of said current pulse produced in response to application of said input signal to said transistor to reduce generation of spurious signals in non-selected data lines.

3. A fixed information storage system comprising a plurality of data elements, each data element being a magnetic device that has linear magnetic characteristics, a plurality of data lines, each data line linking a different group of data elements, a readout line coupled to each data element, means for selecting a particular data line including a plurality of input selection means, each said selection means including a solid state device having emitter, base and collector terminals, each said solid state device being connected in common base configuration and having its collector terminal connected to one end of a data line and its base terminal connected to a selector switch, a constant current source connected to the emitter terminals of all of said solid state devices, means responsive to an input signal for applying a current pulse from said constant current source to the selected data line to produce output signals in said readout lines of those data elements coupled to said selected data line, and means for discriminating between output signals from the data elements coupled to said selected data line and spurious output signals from other data elements comprising a storage device connected to each said readout line and means for applying a reset signal to said storage devices in overlap with said input signal, said reset signal terminating prior to said input signal.

4. A fixed information storage system comprising a plurality of data elements, each data element being a magnetic device that has linear magnetic characteristics, a plurality of data lines, each data line linking a different group of data elements, a readout line coupled to each data element, means for selecting a particular data line including a plurality of input selection means, each said selection means including a solid state device having emitter, base and collector terminals, each said solid state device being connected in common base configuration and having its collector terminal connected to one end of a data line and its base terminal connected to a selector switch, a constant current source connected to the emitter terminals of all of said solid state devices, said constant current source including means for modifying the leading edge of said current pulse to reduce generation of spurious signals in non-selected data lines, and means responsive to an input signal for applying a current pulse from said constant current source to the selected data line to produce output signals in said readout lines of those data elements coupled to said selected data line.

* * * * *